(12) United States Patent
Ramakrishnan et al.

(10) Patent No.: US 8,554,941 B2
(45) Date of Patent: Oct. 8, 2013

(54) SYSTEMS AND METHODS FOR DISTRIBUTING VIDEO ON DEMAND

(75) Inventors: Kadangode Ramakrishnan, Berkeley Heights, NJ (US); Samrat Bhattacharjee, Silver Spring, MD (US); Tae Won Cho, Austin, TX (US); Vijay Gopalkrishnan, Florham Park, NJ (US); Rittwik Jana, Parsippany, NJ (US); Divesh Srivastava, Summit, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 407 days.

(21) Appl. No.: 11/848,031

(22) Filed: Aug. 30, 2007

(65) Prior Publication Data

US 2009/0063681 A1 Mar. 5, 2009

(51) Int. Cl.
G06F 15/16 (2006.01)

(52) U.S. Cl.
USPC ........... 709/231; 709/203; 709/217; 709/218; 709/219; 725/87; 725/97; 725/101

(58) Field of Classification Search
USPC .......................................... 709/229, 231–232
See application file for complete search history.

(56) References Cited

U.S. PATENT DOCUMENTS

| 5,461,415 | A | * | 10/1995 | Wolf et al. | 725/88 |
|---|---|---|---|---|---|
| 5,561,456 | A | * | 10/1996 | Yu | 725/97 |
| 5,926,649 | A | * | 7/1999 | Ma et al. | 710/6 |
| 5,940,391 | A | * | 8/1999 | Malkin et al. | 370/390 |
| 5,978,843 | A | * | 11/1999 | Wu et al. | 709/219 |
| 6,263,411 | B1 | * | 7/2001 | Kamel et al. | 711/167 |
| 6,378,036 | B2 | * | 4/2002 | Lerman et al. | 711/112 |
| 6,609,149 | B1 | * | 8/2003 | Bandera et al. | 709/219 |
| 6,751,673 | B2 | * | 6/2004 | Shaw | 709/231 |
| 6,795,863 | B1 | * | 9/2004 | Doty, Jr. | 709/231 |
| 6,973,081 | B1 | * | 12/2005 | Patel | 370/390 |
| 7,031,326 | B1 | | 4/2006 | Shur et al. | |
| 7,039,672 | B2 | * | 5/2006 | Wu et al. | 709/201 |
| 7,043,524 | B2 | * | 5/2006 | Shah et al. | 709/203 |
| 7,149,797 | B1 | * | 12/2006 | Weller et al. | 709/223 |
| 7,346,698 | B2 | * | 3/2008 | Hannaway | 709/231 |
| 7,477,653 | B2 | * | 1/2009 | Smith et al. | 370/432 |
| 7,562,375 | B2 | * | 7/2009 | Barrett et al. | 725/38 |
| 7,627,887 | B2 | * | 12/2009 | Bisher et al. | 725/91 |
| 7,793,329 | B2 | * | 9/2010 | Joshi et al. | 725/120 |
| 7,886,056 | B2 | * | 2/2011 | Collet et al. | 709/226 |
| 7,886,073 | B2 | * | 2/2011 | Gahm et al. | 709/231 |
| 7,921,448 | B2 | * | 4/2011 | Fickle et al. | 725/95 |
| 2002/0078219 | A1 | * | 6/2002 | Tate et al. | 709/231 |
| 2002/0114331 | A1 | * | 8/2002 | Cheung et al. | 370/390 |
| 2002/0124258 | A1 | * | 9/2002 | Fritsch | 725/88 |
| 2002/0131423 | A1 | * | 9/2002 | Chan et al. | 370/400 |
| 2002/0133830 | A1 | * | 9/2002 | Kim et al. | 725/142 |
| 2002/0147979 | A1 | * | 10/2002 | Corson | 725/90 |
| 2003/0037331 | A1 | * | 2/2003 | Lee | 725/32 |
| 2003/0051251 | A1 | * | 3/2003 | Sugimoto et al. | 725/95 |

(Continued)

*Primary Examiner* — David Lazaro
*Assistant Examiner* — Sarah Drabik
(74) *Attorney, Agent, or Firm* — Guntin & Gust, PLC; Ed Guntin

(57) ABSTRACT

A method of providing content comprises making the content available on a central server, and surveying a plurality of peers for a portion of the content. The portion of the content from one of the peers is obtained when the portion of the content is available from the one of the peers, and obtained from the central server when the portion of the content is not available from the plurality of peers.

7 Claims, 10 Drawing Sheets

(56) References Cited

U.S. PATENT DOCUMENTS

| | | | |
|---|---|---|---|
| 2003/0093802 A1* | 5/2003 | Cho et al. ................. | 725/90 |
| 2004/0125760 A1* | 7/2004 | Newberg et al. ........... | 370/312 |
| 2004/0153951 A1* | 8/2004 | Walker et al. ............. | 714/776 |
| 2004/0172478 A1* | 9/2004 | Jacobs et al. .............. | 709/233 |
| 2005/0015509 A1* | 1/2005 | Sitaraman ................. | 709/231 |
| 2005/0080894 A1* | 4/2005 | Apostolopoulos et al. ... | 709/224 |
| 2005/0089035 A1* | 4/2005 | Klemets et al. ............ | 370/390 |
| 2005/0108765 A1* | 5/2005 | Barletta et al. ............ | 725/90 |
| 2005/0190781 A1* | 9/2005 | Green et al. ............... | 370/432 |
| 2005/0216942 A1* | 9/2005 | Barton ..................... | 725/97 |
| 2006/0184688 A1* | 8/2006 | Ganguly et al. ............ | 709/232 |
| 2006/0198392 A1* | 9/2006 | Park et al. ................. | 370/468 |
| 2006/0200576 A1* | 9/2006 | Pickens et al. ............. | 709/231 |
| 2007/0005792 A1* | 1/2007 | Collet et al. ............... | 709/231 |
| 2007/0101012 A1* | 5/2007 | Li et al. .................... | 709/231 |
| 2007/0121629 A1* | 5/2007 | Cuijpers et al. ............ | 370/390 |
| 2007/0160048 A1* | 7/2007 | Faucheux et al. .......... | 370/390 |
| 2007/0180465 A1 | 8/2007 | Ou et al. | |
| 2007/0199041 A1 | 8/2007 | Noll et al. | |
| 2010/0263012 A1* | 10/2010 | Huang et al. .............. | 725/116 |

* cited by examiner

SYSTEMS AND METHODS FOR DISTRIBUTING VIDEO ON DEMAND

FIELD OF THE DISCLOSURE

The present disclosure generally relates to communications networks, and more particularly relates to system and methods for distributing video on demand.

BACKGROUND

Multicasting of video streams has been proposed in order to eliminate duplicate streams flowing through common links in a network. Multiple multicast streams are started for each video—streams for the entire video started some time apart, or one stream for a segment of the video—and are cycled over time. Multicasting streams this way scales with the number of individual streams started and is independent of the number of individual users. Multicasting, while effective for streaming live content, comes with complications in the Video on Demand (VOD) arena. Users may request content at times other than when a multicast stream starts, or may attempt to rewind or fast-forward the video. Thus, multicasting has to be augmented with other approaches before it can be applied to VOD. One popular approach is to unicast streams from the server until the point when the user can be transitioned off to a multicast stream. This approach may unduly stress the network infrastructure.

Content distribution networks (CDNs) have also been proposed as viable approaches for facilitating distribution of videos on-demand. Because CDNs are normally located at the edge of the network close to the user, starting unicast streams from these CDNs distributes the load among the servers and bypasses the points of congestion in the core of the network. The CDN can cache content the first time it is requested and can then use this cached data to serve any future requests. Further, CDNs can be arranged as hierarchies such that they do not have to store all possible content; instead they can cooperatively cache the content and use other mechanisms to locate and share necessary content.

Recently, techniques that leverage the existence of data on the end-hosts (peers) have also been recently suggested for VOD. End hosts participate actively in the system by storing video and by streaming video to other users, thereby alleviating load off the servers. Using these peers for streaming allows for many different combinations of approaches to be applied to address the scalability issues of Internet-based VOD. P2Cast constructs application level multicast trees rooted at the central video servers and comprised of the clients. Video is streamed over the multicast tree to the clients, and clients that arrive late also join the multicast tree. However, the initial part of the stream that was missed may need to be patched, and this can be done by contacting the server or by using the other clients that have cached the initial part of the video. The use of application layer multicast naturally degenerates into a unicast when there is only one viewer watching a particular video (as can be expected with unpopular videos) and no special handling for unpopular videos is necessary. This approach can also be adopted to native IP multicast-based VoD streams.

Alternately, a swarming-based approach is possible where the system relies entirely on peers for the video and utilizes the central server as a directory that maps the data to the peer storing the data. Such an approach has been proposed that arranges the peers in a mesh topology and utilizes a central server that acts as a directory. At least one such proposal employs network coding to obviate the need to schedule fetching of blocks from peers.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
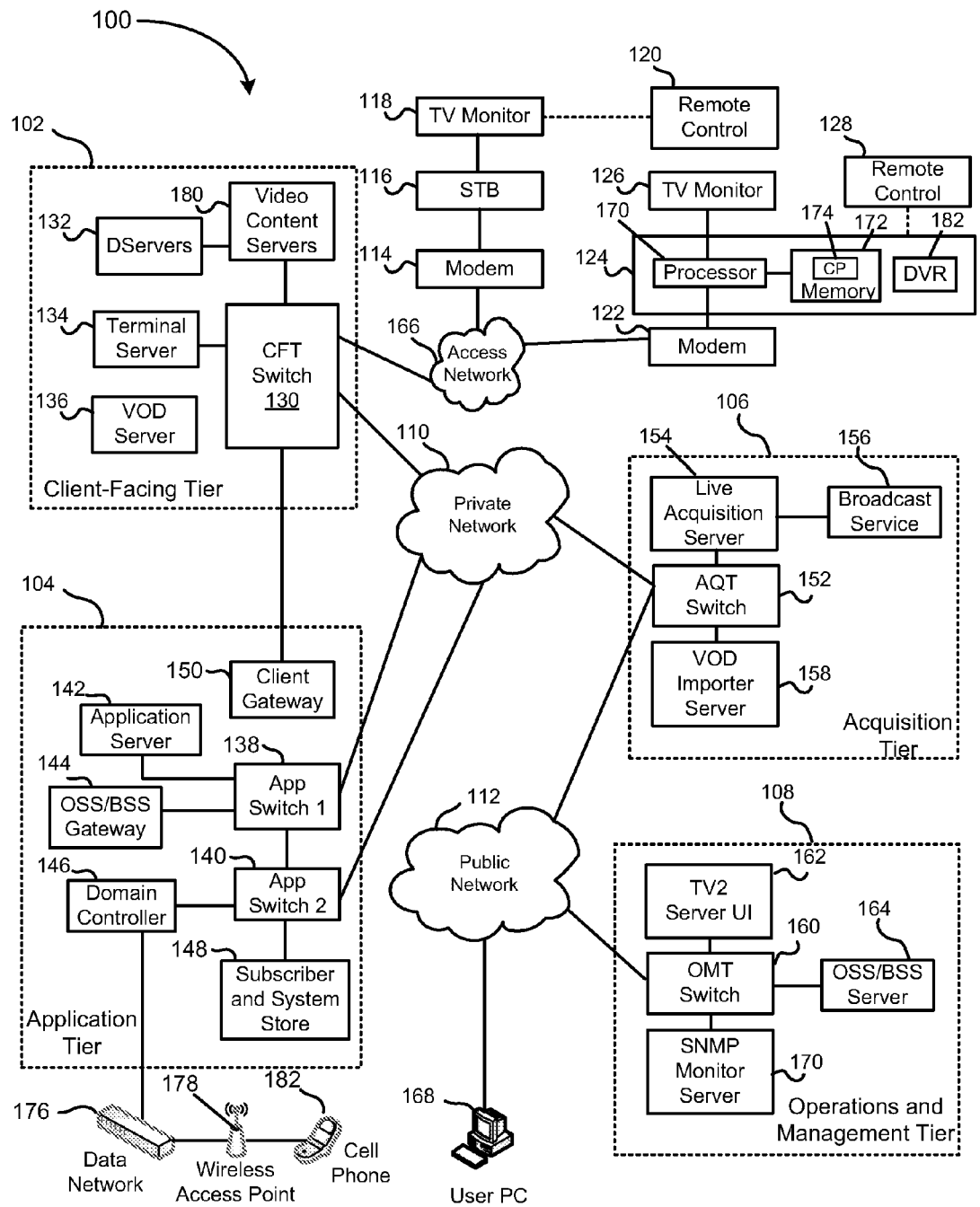
FIG. 1 is a block diagram illustrating an embodiment of an Internet Protocol Television (IPTV) system.

FIG. 1 shows an IPTV system 100 that can include a client facing tier 102, an application tier 104, an acquisition tier 106, and an operations and management tier 108. Each tier 102, 104, 106, and 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems, such as a first modem 114 and a second modem 122 can be coupled to the private access network 166. The client-facing tier 102 can communicate with a first representative set-top box device (STB) 116 via the first modem 114 and with a second representative set-top box device 124 via the second modem 122. The client-facing tier 102 can communicate with a large number of set-top boxes, such as the representative set-top boxes 116 and 124, over a wide geographic area, such as a regional area, a metropolitan area, a viewing area, or any other suitable geographic area that can be supported by networking the client-facing tier 102 to numerous set-top box devices. In an illustrative embodiment, the client facing tier or any portion thereof can be included at a video head-end office.

In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received through the private access network 166 via an IPTV software platform such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display devices 118 and 126 to which it is coupled. In an illustrative embodiment, the set-top box devices 116 and 124 can include tuners that receive and decode television programming information for transmission to the display devices 118 and 126. The television tuner can be National Television System Committee (NTSC) tuner, an Advanced Television System Committee (ATSC), another suitable analog or digital tuner, or any combination thereof. A signal for a television channel can pass through the tuner before the content is displayed on a monitor.

In an exemplary, non-limiting embodiment, STB devices 116 and 124 can receive video content, which may include video and audio portions, from the client-facing tier 102 via the private access network 166. The STB device 116 and 124 can transmit the video content to an external display device, such as the television monitors 118 and 126. The STB devices 116 and 124 can also communicate commands received from the remote control devices 120 and 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers via their STB devices 116 and 124. In an illustrative, non-limiting embodiment, the video content servers 180 can include one or more multicast servers.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138 to the second APP switch 140, and the second APP switch 140 can communicate the query across the public network 112 to an OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, for example because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment during operation of the IPTV system, the live acquisition server 154 can acquire television or movie content. The live acquisition server 154 can transmit the television or movie content to the AQT switch 152, and the AQT switch can transmit the television or movie content to the CFT switch 130 via the private network 110.

Further, the television or movie content can be transmitted to the video content servers 180, where it can be encoded, formatted, stored, or otherwise manipulated and prepared for communication to the STB devices 116 and 124. The CFT switch 130 can communicate the television or movie content to the modems 114 and 122 via the private access network 166. The STB devices 116 and 124 can receive the television or movie content via the modems 114 and 122, and can transmit the television or movie content to the television monitors 118 and 126. In an illustrative embodiment, video or audio portions of the television or movie content can be streamed to the STB devices 116 and 124.

Further, the AQT switch can be coupled to a VOD importer server 158 that stores television or movie content received at the acquisition tier 106 and communicates the stored content to the VOD server 136 at the client-facing tier 102 via the private network 110. Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the STB devices 116 and 124, the requests can be transmitted over the private access network 166 to the VOD server 136 via the CFT switch 130. Upon receiving such requests, the VOD server 136 can retrieve the requested VOD content and transmit the content to the STB devices 116 and 124 across the private access network 166 via the CFT switch 130. The STB devices 116 and 124 can transmit the VOD content to the television monitors 118 and 126. In an illustrative embodiment, video or audio portions of VOD content can be streamed to the STB devices 116 and 124.

The operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to the OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television or movie content to the AQT switch 152, and the AQT switch 152 in turn can transmit the television content to the CFT switch 130 via the private network 110 or to the OMT switch 160 via the public network 112. Further, the television content can be encoded at the D-servers 132, and the CFT switch 130 can communicate the television content to the modems 114 and, 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to set-top box devices 116 and 124, the request can be transmitted over the private access network 166 to the VOD server 136 via the CFT switch 130. Upon receiving such a request, the VOD server 136 can retrieve requested VOD content and transmit the content to the set-top box devices 116 and 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 182.

In a particular embodiment, a set-top box device such as the second set-top box device 124 can include an STB processor 170 and an STB memory device 172 that is accessible to the STB processor 170. The set-top box device 124 also includes a STB computer program 174 that is embedded within the STB memory device 172. In a particular embodiment, the STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124, by associating the user account with an IP address of the second set-top box device with data relating to one or more twisted pairs connected with the second set-top box device 124, with data related to one or more fiber optic cables connected with the second set-top box device 124, with an alphanumeric identifier of the second set-top box device 124, with any other data that is suitable for associating second set-top box device 124 with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 182. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 182. In an illustrative embodiment, the status can be sent via a wireless access protocol (WAP). Further details of the IPTV system are taught in U.S. Patent Application Publication No. 2007/0199041, the disclosure of which is hereby incorporated by reference.

Figure 2:
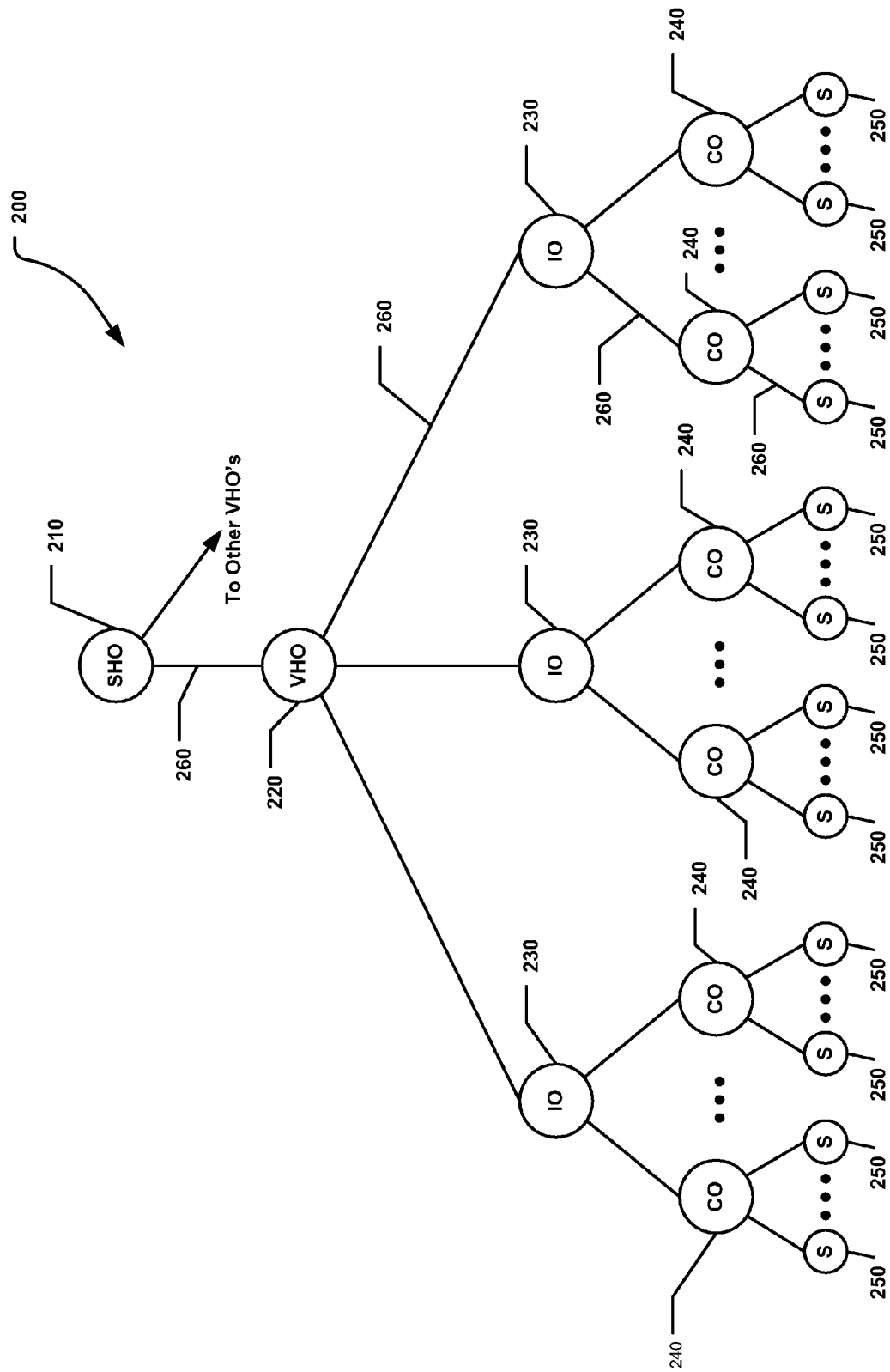
FIGS. 2, 3, and 4 are block diagrams illustrating an embodiment of an IPTV network.

FIG. 2 shows one example embodiment of a television distribution system or network 200, using IPTV technology in this example but not limited thereto, adapted to provide, among other things, the VOD features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and, finally, the subscribers (S) 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast TV (or linear) programming. A redundant SHO 210 may be provided for backup in case of failure. The SHO 210 may also provide the central point of on-demand content acquisition and insertion into the IPTV network. Linear programming may be received at the SHO 210 via satellite and processed for delivery to the VHO 220. On demand content may be received from various sources and processed/encoded to codec and bit-rate requirements for the communication network for transmission to the VHO 220 over the high speed communication links. The VHOs 220 are the video distribution points within each demographic market area (DMA) or geographic region.

Figure 3:
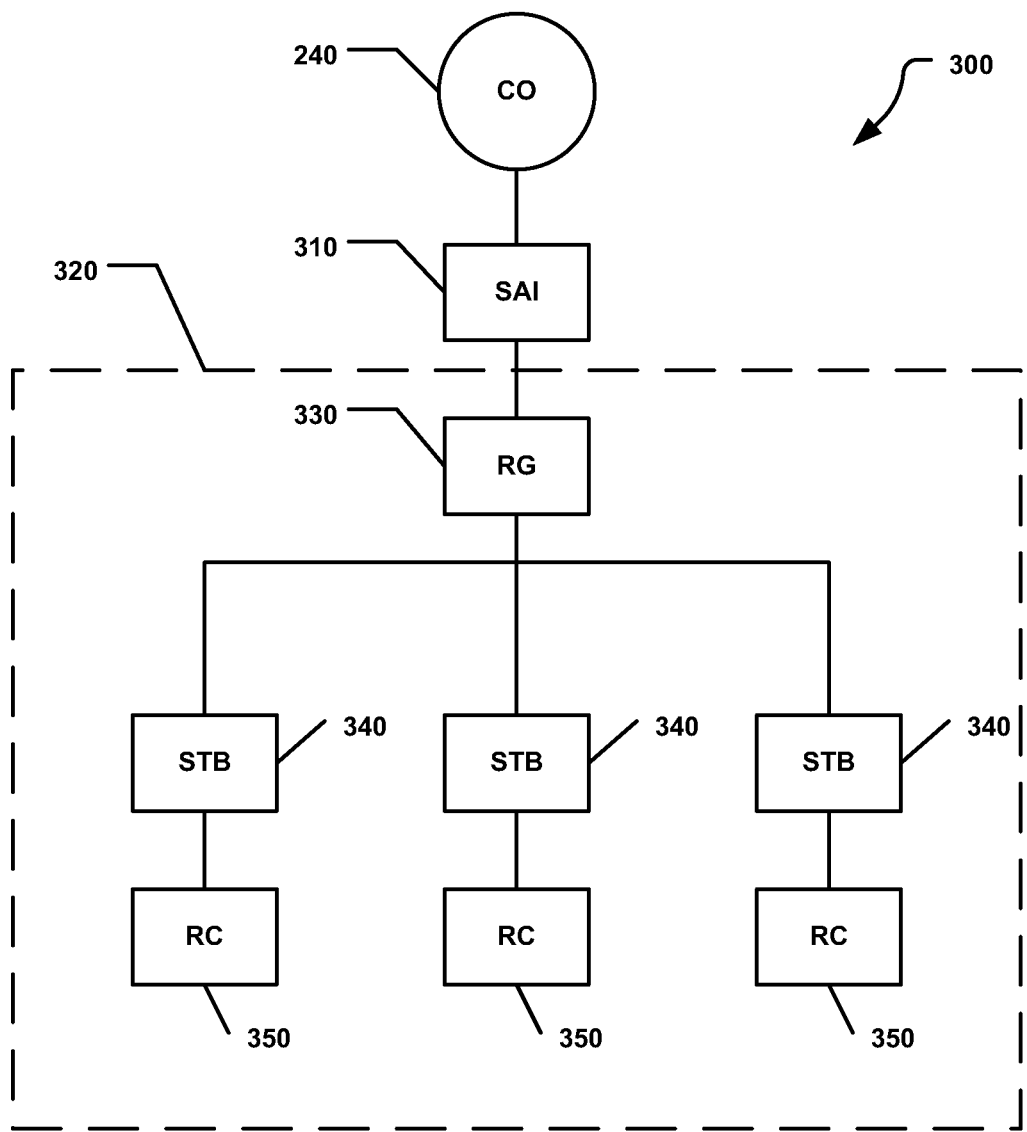

FIG. 3 shows an example network architecture 300 between the CO 240 and the subscriber 250. A serving area interface (SAI) 310 may be connected to the CO 240. SAI 310 may, for example, be located in a weather-proof enclosure proximate the subscriber 250 premises, and may include fiber-to-the-node (FTTN) equipment. FTTN equipment may also be located in the CO 240. Customer premise equipment (CPE) 320 includes, for example, a network interface device (NID) and a residential gateway (RG) 330, with a built-in very-high-bit-rate digital subscriber loop (VDSL) modem or optical network termination (ONT). In either case the RG 330 may be connected to the rest of the home set top boxes (STB) 340 via an internal network such as an Ethernet. Each STB 340 has an associated remote control (RC) 350 which provides data entry to the STB 340 to control the IPTV selections from the IPTV data streams.

Figure 4:
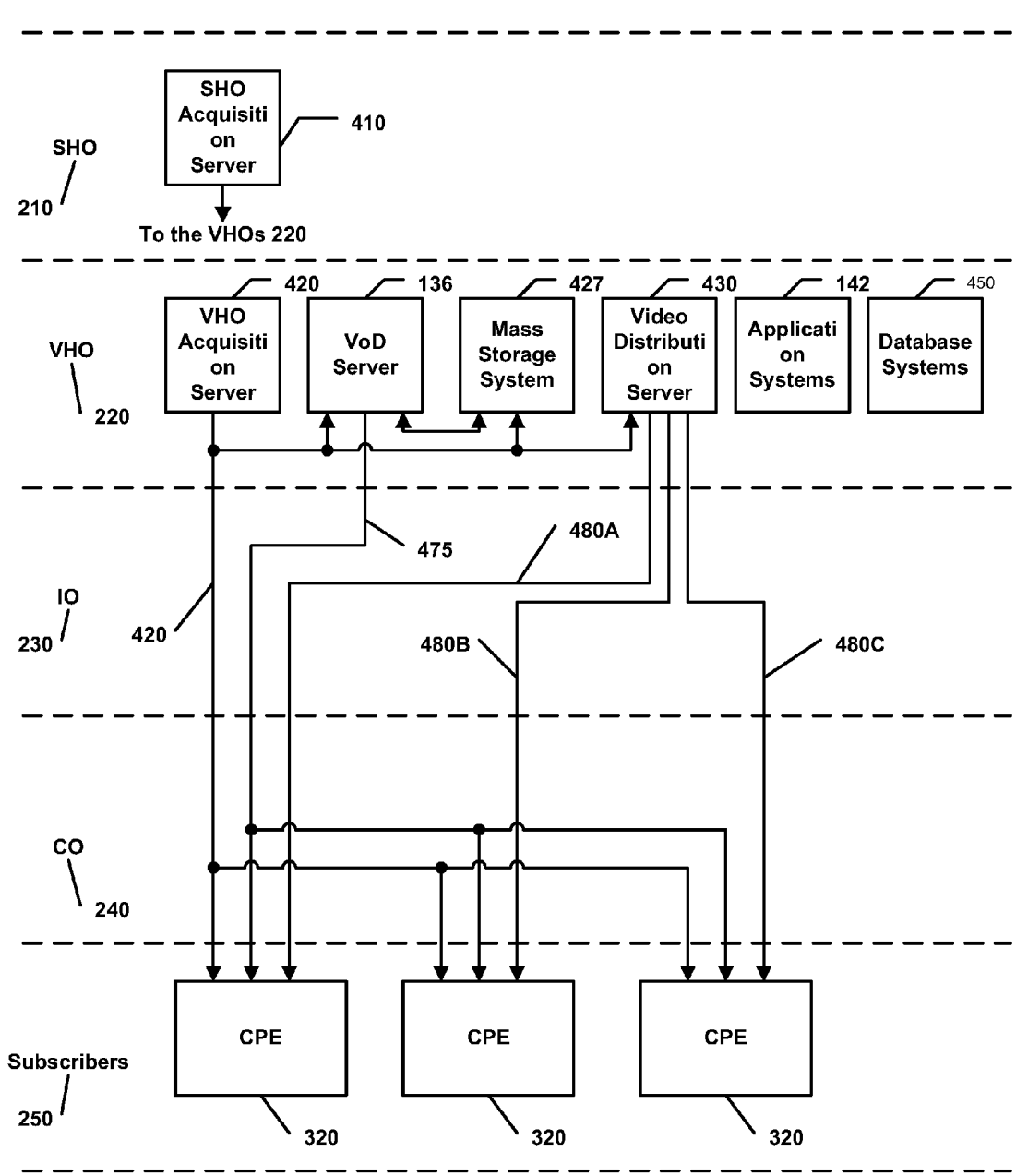

FIG. 4 shows one example embodiment of an SHO acquisition server 410 that may be used to acquire national content to be distributed towards the VHO 220. In an alternative embodiment, live television content may be acquired using an acquisition server in the VHO 220. In this configuration, the VHO 220 may include a live television acquisition server 420 and a video distribution server 430, which forward the live television and/or other content toward the subscribers 250 through the intermediate offices (IOs) 230 and the central office (CO) 240. A VHO 220 may also include application server 142, and regional subscriber 250 database systems 450. The COs 240 are connected to the IOs 230 to further distribute traffic towards the subscribers 250. Traffic may reach the subscribers 250 at least partially via either fiber to the node (FTTN) or fiber to the premises (FTTP), or by other types of transmission medium.

The acquisition server 420 may distribute a plurality of live television programs, each typically associated with a television "channel," using a multicast IP protocol data stream 470 through the IOs 230 and COs 240 to the subscribers 250. The routers, switches, and other network elements that would normally be present in the IOs 230 and COs 240 are not shown in FIG. 4 in order to simplify the drawing. The number of programs or channels sent in the multicast stream may, without limitation, range up to 800 channels or more using present technology, with it being understood that advances in technology may allow many more channels to be sent. The multicast protocol allows for efficient distribution of these signals to a large number of end subscribers 250. In addition, the video distribution server 430 receives the multicast data stream 470, and distributes selected ones of the live television signals, extracted from the stream 470, using a unicast data stream 480a, 480b, or 480c, to specific subscribers 250. In this embodiment, video distribution server 430 may provide a unicast stream, for example in burst mode, of a specific live television channel to any of the subscribers 250 served by the VHO 220. The burst mode instant channel change data stream can be discontinued once the subscriber's 250 system is loaded with enough TV program data so that the multicast stream can "catch up" and take over supplying the program data stream in the multicast mode for more extended term viewing by the subscriber 250.

Also provided in the VHO 220, or alternatively at another distribution point in the IPTV network such as the SHO 210, IO 230, or CO 240, is a VOD server 136 that distributes content to subscribers 250 using a unicast data stream in the same manner as server 430. VOD server 136 may be connected to, in one example embodiment, one or more mass storage devices or systems 427, such as magnetic disk drives or optical recording systems. In addition, VOD server 136 includes software to support interaction with subscribers 250 through STB 340. For example, subscribers 250 can, interact with the VOD server 136 using a remote control 350 and an STB 340 to request delivery of the content to them from VOD server 136. The subscribers 250 may request content on VOD server 136, which is delivered, in one example embodiment, with unicast data streams 490A, 490B, or 490C.

According to one embodiment, access to regularly scheduled programming on the television channels, or alternatively access to programming under the control of VOD server 136, may be controlled by an STB 340 in the subscriber 250's premises. Thus, in one example embodiment, each subscriber 250 receives live television programs from the video acquisition server 420 based on IP-based multicasting services, while the video distribution servers 430 are used to provide subscribers 250 "instant" channel change and recover video packet losses to maintain acceptable quality of service. Further, the VOD server 136 provides television programming upon demand by subscribers 250 as more fully described herein.

According to one example embodiment, referring to FIGS. 3 and 4, TV shows may be monitored on the subscriber 250 side, for example in the STB 340. On the subscriber 250 side, the STB 340 receive subscriber 250-initiated control commands from, for example the RC 350, such as channel changes, video-on-demand program ordering, and other control information. This information can be used to collect accurate information of all the subscribers 250's TV viewing information by querying each individual subscriber's 250 STB 340. Alternatively, if such statistics are not available from the STB 340, subscriber 250 viewing information can be obtained from the RG 330 based on IP multicast information obtained from the RG 330. In another embodiment, the subscriber 250 viewing information may be obtained from the VHO 220 based on, for example, channel-change requests sent from the STB 340 to the video distribution server 430 in VHO 220. As a result, subscriber 250 channel-change information can be collected from the video distribution server 430 and used to determine the overall viewing of a particular show.

Figure 5:
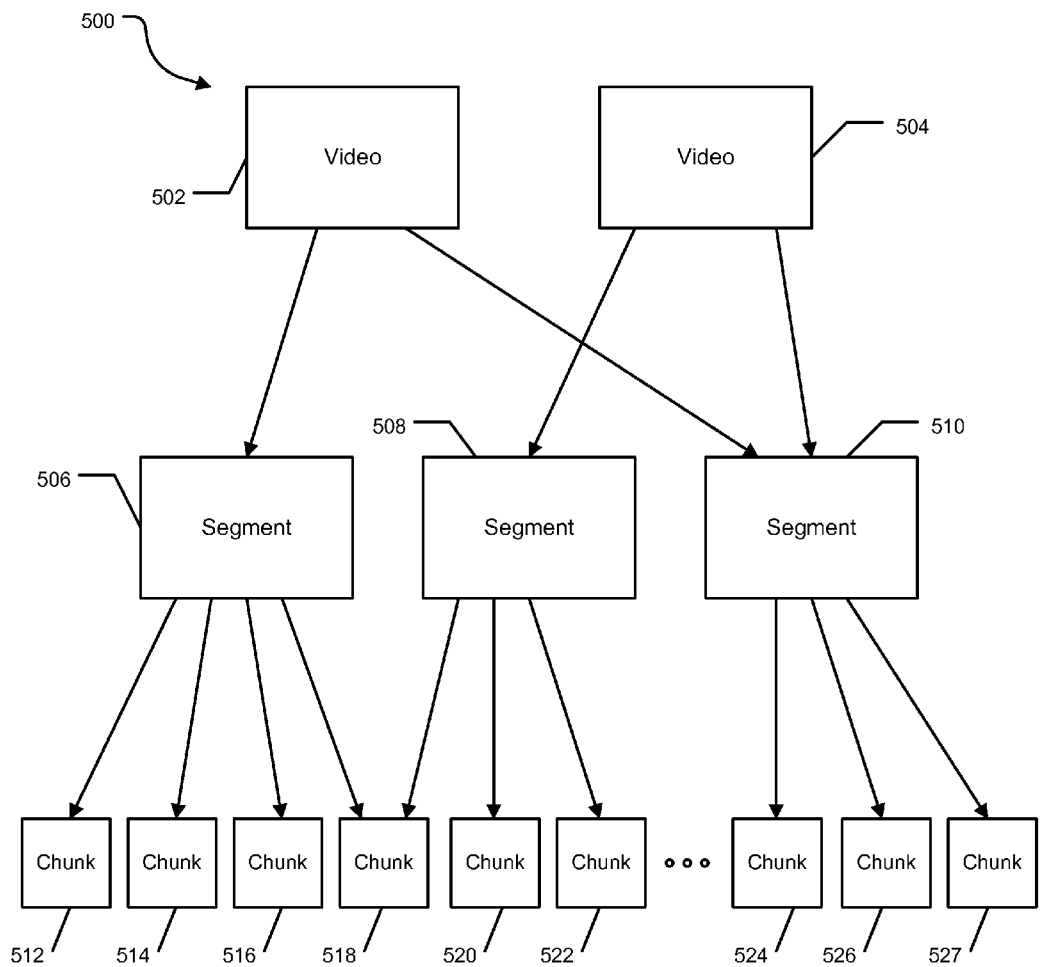
FIG. 5 is a block diagram illustrating an exemplary data model.

FIG. 5 shows an exemplary data model, generally designated 500. Video content 502 and 504 can consist of a sequence of segments 506, 508, and 510. A segment 510 can be part of multiple videos 502 and 504. Segments 506, 508, and 510 can be comprised of a sequence of chunks 512, 514, 516, 518, 520, 522, 524, 526, and 527. Chunks 512, 514, 516, 518, 520, 522, 524, 526, and 527 may be relatively small, not greater than about 180 seconds, such as not greater than about 60 seconds, preferably not greater than about 30 seconds. The size of the chunks 512, 514, 516, 518, 520, 522, 524, 526, and 527 may be chosen based on several considerations, including typical view size of small videos, amortization of overhead, and resilience to download failures from a serving node. Each chunk 512, 514, 516, 518, 520, 522, 524, 526, and 527, segment 506, 508, and 510, and video 502 and 504 can be assigned a globally unique identifier (GUID). Additionally, a chunk 512, 514, 516, 518, 520, 522, 524, 526, and 527 may have multiple GUIDs.

In an exemplary embodiment, the subscriber 250 may request video content 502 from the VOD server 136 for viewing. The STB 340 can request chunks 512, 514, 516, 524, 526, and 527 that make up each segment 506 and 510 of the video content 502. The STB can request individual chunks 512, 514, 516, 524, 526, and 527 or a sequence of chunks 512, 514, 516, 524, 526, and 527. Additionally, the STB 340 may simultaneously request multiple chunks 512, 514, 516, 524, 526, and 527. The chunks 512, 514, 516, 524, 526, and 527 may be provided from a single source or from multiple sources. Further, the chunks 512, 514, 516, 524, 526, and 527 may be provided sequentially or non-sequentially. For example, the STB 340 may request chunks 512, 514, 516, 524, 526, and 527 from multiple segments 506 and 510. In this way, the STB 340 may prefetch and cache later segments 506 and 510 of the video content 502. When the chunks are provided non-sequentially, the STB 340 reorders the chunks 512, 514, 516, 524, 526, and 527 to provide the video content 502.

In an exemplary embodiment, requests for chunks 512, 514, 516, 518, 520, 522, 524, 526, and 527 can include a deadline. For example, if a chunk 512, 514, 516, 518, 520, 522, 524, 526, and 527 will be used for playback in 45 seconds, the deadline would indicate the chunk 512, 514, 516, 518, 520, 522, 524, 526, and 527 is required prior to 45 seconds. The STB 340 may simultaneously request multiple chunks 512, 514, 516, 518, 520, 522, 524, 526, and 527 having different deadlines, such that chunks 512, 514, 516, 518, 520, 522, 524, 526, and 527 with shorter deadlines can have priority over chunks 512, 514, 516, 518, 520, 522, 524, 526, and 527 with longer deadlines. Additionally, the VOD server 136 may aggregate requests from multiple STBs 340 based on the deadline. For example, a first STB may request a chunk with a deadline of 45 seconds and a second STB may request the chunk with a deadline of 30 seconds. The VOD server 136 may aggregate the request to provide both the first and second STBs the chunk within 30 seconds using a multicast stream.

The segments may include information regarding transformation of the chunks. For example, the same content may be available for devices with a variety of bit rates, such as high-definition television (HDTV), standard definition television (SDTV), computers and hand-held devices. The segment may include information on providing content with the appropriate bit-rate to various devices. In an exemplary embodiment, the VOD server may store multiple copies of each chunk at the various bit-rates. In an alternate embodiment, the VOD server may store a single copy of each chunk at the highest bit-rate and transcode to the required bit-rate as each chunk is requested. In a further embodiment, the VOD server may initially store the highest bit-rate chunk and store lower bit-rate chunks as they are requested. For example, the first time a chunk is requested at lower bit-rate, the VOD server may transcode the chunk and may store the lower bit-rate chunk for subsequent requests of the chunk at the lower resolution.

Figure 6:
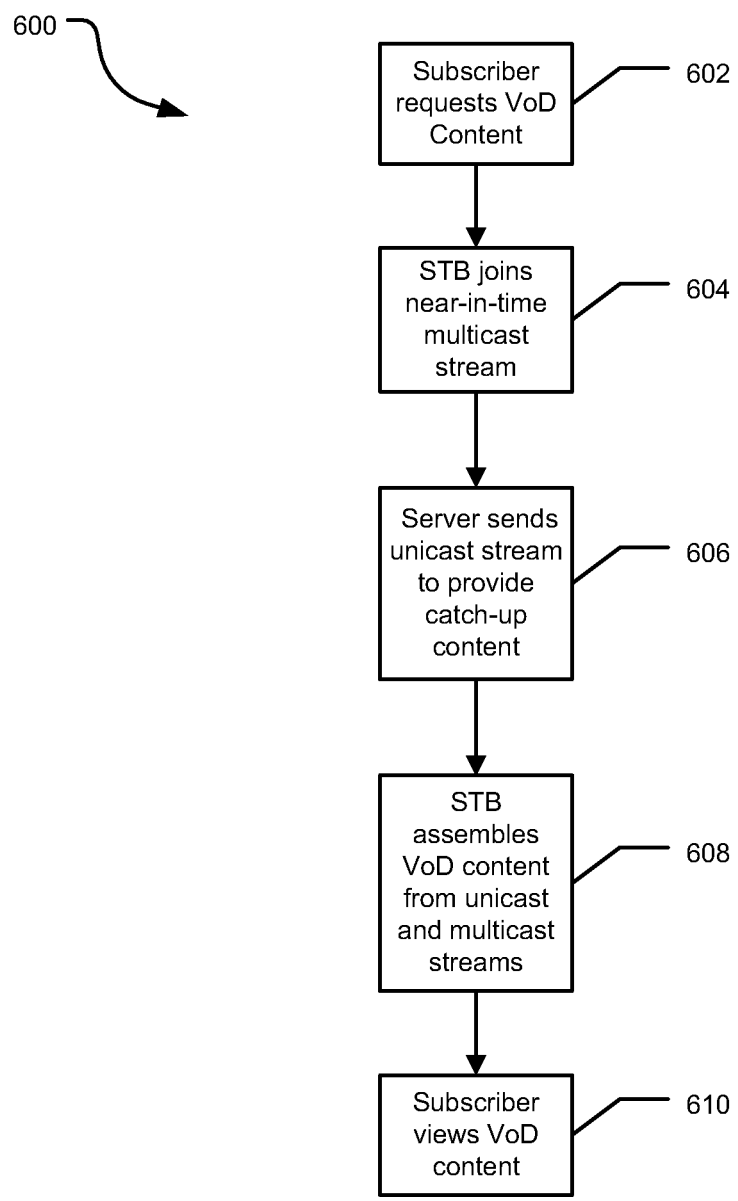
FIG. 6 is a flow diagram illustrating an exemplary method of provide VOD content through a multicast stream.

FIG. 6 shows a flow diagram for providing a multicast stream for VOD content, generally designated 600. At 602, a subscriber may request VOD content. At 604, STB can join a near-in-time multicast stream. The near-in-time multicast stream is an existing multicast stream providing the VOD content to multiple subscribers. The multicast stream allows the server to provide the same VOD content to a relatively large number of subscribers with minimal server overhead. However, the near-in-time multicast stream may be providing a later portion of the VOD content. The STB can cache the VOD content from the multicast stream for later playback. At 606, the VOD server sends a unicast stream to provide catch-up content. The catch-up content can be the portion of the VOD content between the current playback position and the multicast stream position. For example, if the subscriber requests a movie, the STB may join the near-in-time multicast stream 5 minutes into the movie and catch-up content can include the first 5 minutes of the movie. At 608, the STB assembles the content from the unicast stream and the near-in-time multicast stream, so that the subscriber can view the VOD content, as illustrated at 610. By combining the unicast catch-up content with the near-in-time multicast content, the subscriber can begin to view the VOD content without waiting for another multicast stream to start from the beginning of the VOD content.

In an exemplary embodiment, the STB may join multiple near-in-time multicast streams to retrieve the VOD content.

The number of multicast streams can depend on the available storage capacity and the available bandwidth of the STB. For example, a first multicast stream may be currently providing content from the first segment of a video and a second multicast stream may be currently providing content from a second segment of the video. The STB may join the first multicast stream to receive the first segment and simultaneously join the second multicast stream to receive the second segment. The STB can cache the second segment from the second multicast stream and when the first multicast stream reaches the second segment, the STB can leave the first multicast stream and continue playback from the cached data from the second multicast stream. Additionally, the view can jump between the first segment and the second segment, such as by fast forwarding or reversing playback.

Figure 7:
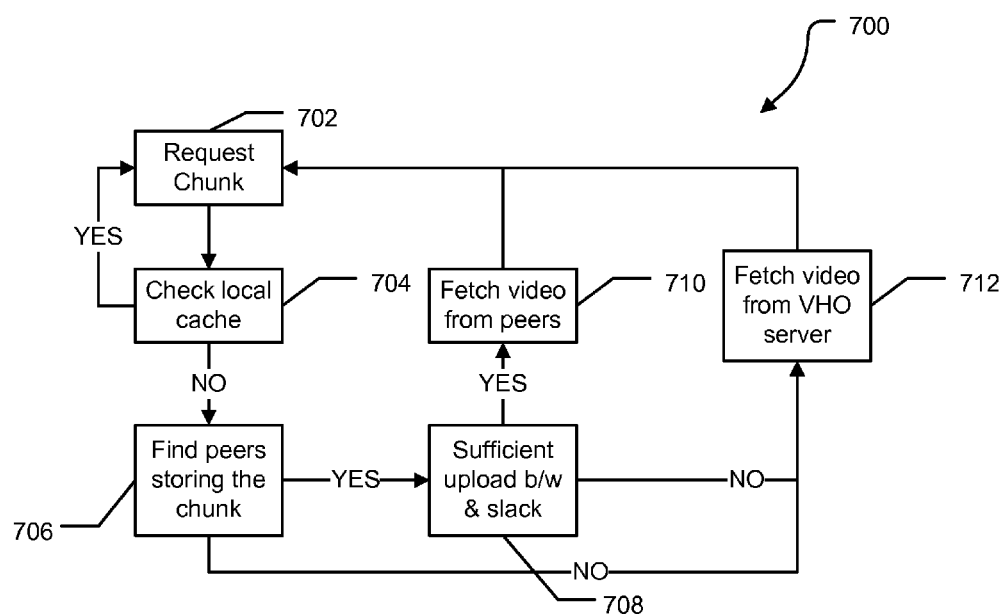
FIG. 7 is a flow diagram illustrating an exemplary method for peer-to-peer distribution of VOD content.

FIG. 7 shows a flow diagram illustrating an exemplary embodiment of peer-to-peer distribution of VOD content, generally designated 700. At 702, an STB may request a chunk for playback of VOD content. The STB can receive information identifying the segments and the chunks that comprise the VOD content. In an exemplary embodiment, the chunk may be part of a request for VOD content not available through a multicast stream. For example, the chunk may be part of a catch-up portion of the VOD content. Alternatively, the chunk may be a portion of the VOD content needed for fast-forwarding. At 704, the STB checks the local cache for the chunk. When the chunk is available from the local cache, the STB can retrieve the chunk from the local cache and may return to 702 to request an additional chunk.

When the chunk is unavailable from the local cache, the STB may find a peer storing the chunk, as illustrated at 706. The STB can determine the deadline for the chunk, such as the time the chunk is required for playback. The peers may be peer STBs that are geographically close to the STB, such as connected to the same SAI, or SAIs located within the same CO. Additionally, peer servers may be located throughout the IPTV network, such as at the CO to cache content close to the subscribers. The STB may send a request to a server to identify which peers are storing the chunk. Alternatively, the STB may send a request to a set of peers to determine which peers are storing the chunk. The request may be a broadcast request to all peers, or it may be directed requests to known peers. Known peers may include peers that have previously requested or served content. When a peer storing the chunk is found, the availability of upload bandwidth from the peer can be determined. When there is sufficient upload bandwidth from the peer, the STB can fetch the chunk from the peer and may returns to 702 to request an additional chunk.

When the chunk a suitable peer is not found, such as no peer is currently storing the chunk is located, at 706, or the peer storing the chunk does not have sufficient bandwidth, at 708, the STB can fetch the chunk from the VOD server, as illustrated at 712, and may return to 702 to request an additional chunk.

In an alternate embodiment, requests for additional chunks may be streamlined. For example, if a peer is found to provide a first chunk, the STB may retrieve additional available sequential chunks from the peer without searching for an alternative peer. Alternatively, if no peer is found with a first chunk, the STB may retrieve several sequential chunks from the VOD server without searching for a peer for a subsequent chunk.

In another exemplary embodiment, the request may include a deadline. The STB can request multiple chunks with different deadlines, such as a first chunk with a short deadline and a second chunk with a long deadline. A peer storing the first and second chunks may not be able to provide the first chunk by the short deadline but could provide the second chunk by the long deadline. The STB may retrieve the first chunk from the VOD server and the second chunk from the peer.

In an exemplary embodiment, the VOD server may preload an STB be with popular content to reduce the startup delay. For example, the STB may cache an initial segment or set of chunks, such as the first five minutes of a recently released movie. Additionally, the STB may be prepopulated with popular jump points, such as a popular segment of a movie. Preloading an initial segment or set of chunks can reduce the startup delay that is needed when joining a multicast stream. Globally popular content could be determined based on the total number of views over a period of time, such as a day, a week, or a month. Additionally, regionally popular content could be identified based on the number of regional views over a period of time. Regional information may be obtained at multiple points within the VOD system, such as the SAIs, COs, or the IOs. Further, individual viewing preferences may identify content likely to be viewed by a subscriber.

In an embodiment, preloading content can be sent to all STBs. In an alternate embodiment, preloaded content can be provided to a geographically distributed subset of STBs. The subset of STBs may be selected such that there is a high probability that the preloaded content is available at an STB connected to an SAI. For example, one STB at each SAI may be provided with preloaded content. By distributing preloaded content to a subset of STBs, the total amount of preloaded content could be increased. For example, several STBs, each having a different set of preloaded content, may be connected to an SAI. Further, using individual viewing history may enhance distribution of preloading content. For example, individual viewing history may identify content likely to appeal to a subscriber that could be preloaded. Additionally, individual view history may identify which STB within the SAI is more likely to require the preloaded content.

Figure 8:
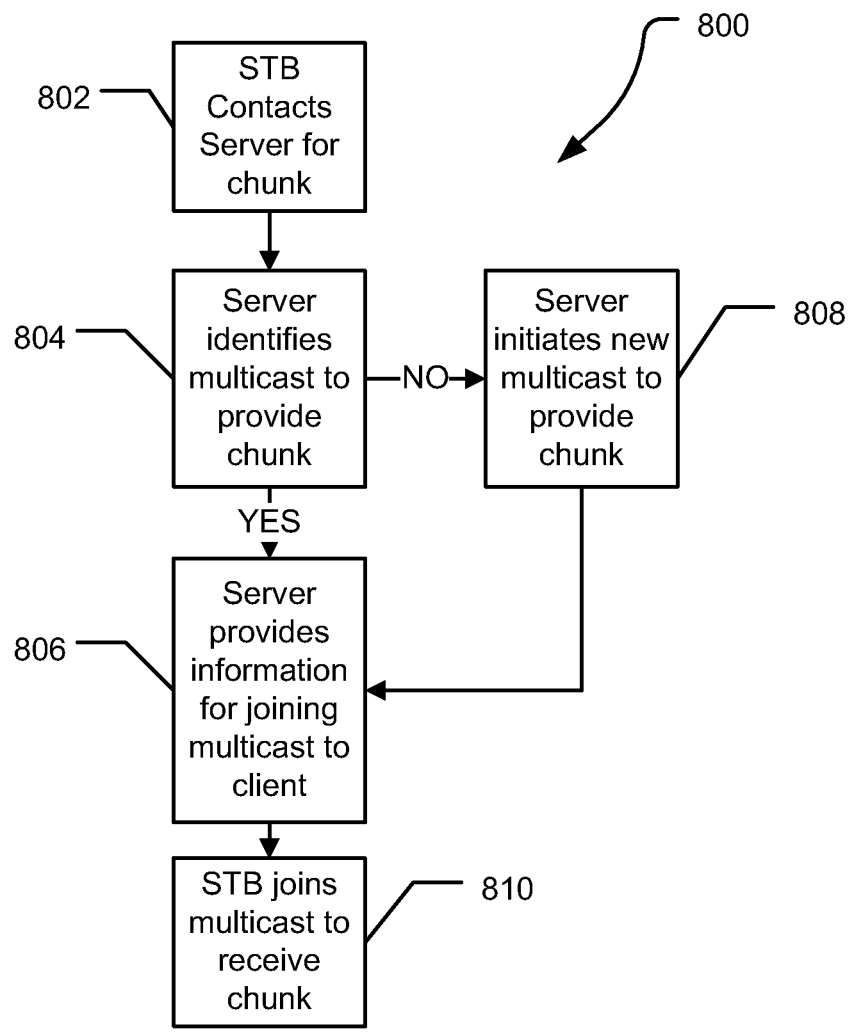
FIG. 8 is a flow diagram illustrating an exemplary method for providing VOD content.

FIG. 8 shows a flow diagram of an exemplary method for providing multicast VOD content, generally designated 800. As illustrated at 802, the STB contacts the VOD server for a chunk, such as when the chunk is not available from a peer prior to the deadline or no peer has the chunk. At 804, the server searches for a multicast stream that can provide the chunk. When a multicast stream is identified, the VOD server provides the STB with information for joining the multicast stream, as illustrated at 806.

Alternatively, when a multicast stream to provide the chunk is not found, such as when the stream will not provide the chunk by the deadline or no other STBs require the chunk, the VOD server may initiate a new multicast to provide the chunk, as illustrated at 808. The VOD server can provide the STB with information for joining the multicast stream, as illustrated at 806. The STB may join the multicast session to receive the chunk, as illustrated at 810.

In an exemplary embodiment, the VOD server may delay a multicast stream, such as just prior to the deadline. When a multicast stream is delayed, additional STBs may join the stream. If the VOD server receives a request for the chunk with an earlier deadline, the delay for the multicast stream is adjusted to just prior to the earlier deadline.

In another exemplary embodiment, may provide information for joining the multicast stream to a random set of additional STBs not requesting the chunk. When an additional STB has sufficient bandwidth and storage, the STB may join the multicast stream. In this way, the chunks with low peer-to-peer availability may be prepopulated.

Figure 9:
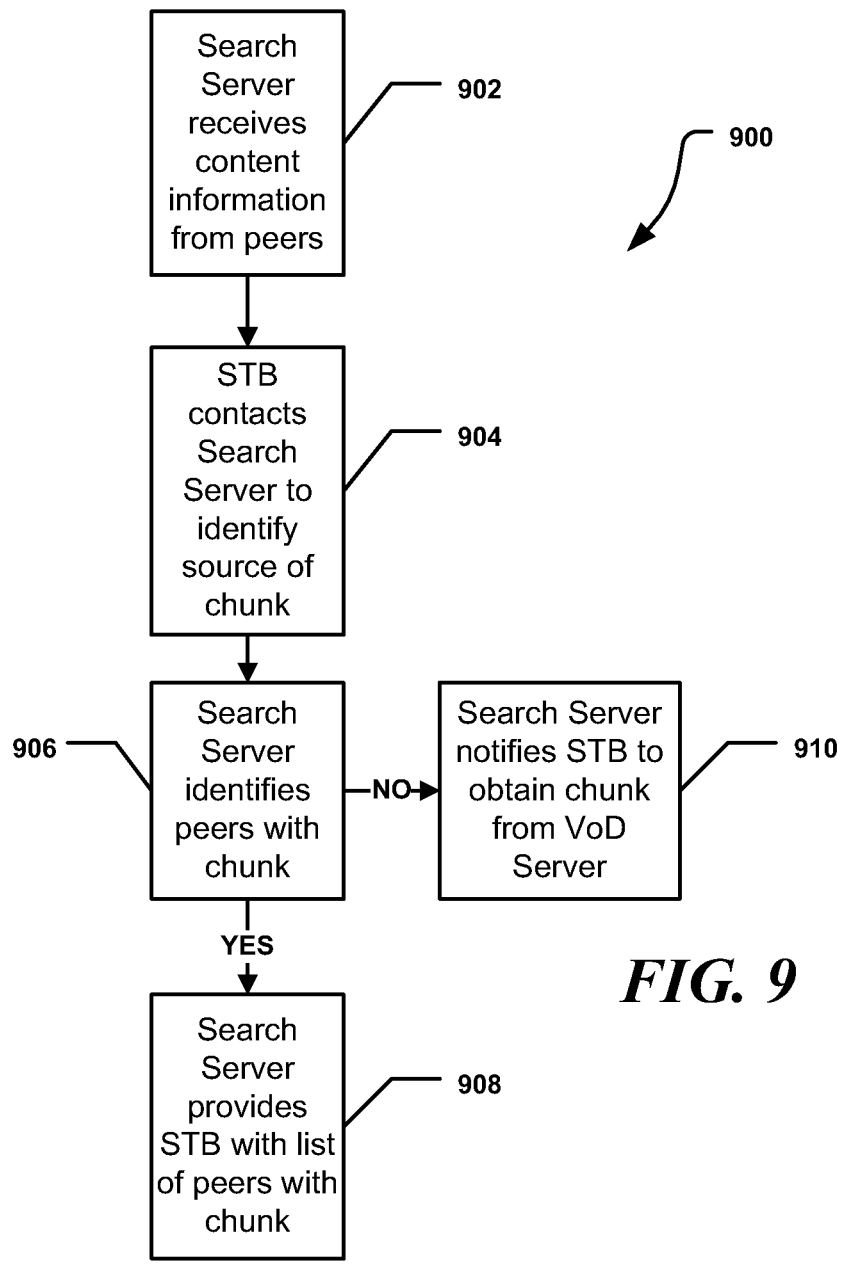
FIGS. 9, 10, and 11 are flow diagrams illustrating exemplary methods for identifying sources for VOD content.

FIG. 9 shows a flow diagram of an exemplary method for identifying sources for VOD content, generally designated

900. As illustrated at 902, a search server may receive information about the chunks stored on each STB. For example, when a STB receives a chunk, the STB may provide the search server with the GUID of the chunk received. The STB can also provide the search server with the GUIDs of chunks that are deleted from the STB. At 904, a STB can contact a search server to identify the source of a chunk. The search server may compare information from peers to identify peers that have the chunk, as illustrated at 906. In an exemplary embodiment, the search server may search information from peers connected to the same SAI prior to searching information from peers connected to an SAI located at the same CO. When a peer is found with the chunk, the search server can provide a list of peers with the chunk to the STB, as illustrated at 908. In an exemplary embodiment, the search server may provide a partial list of peers to the STB, based on proximity of the peers. Alternatively, at 910, when no peer is identified with the chunk, the search server can notify the STB that the chunk needs to be requested from the VOD server.

Figure 10:
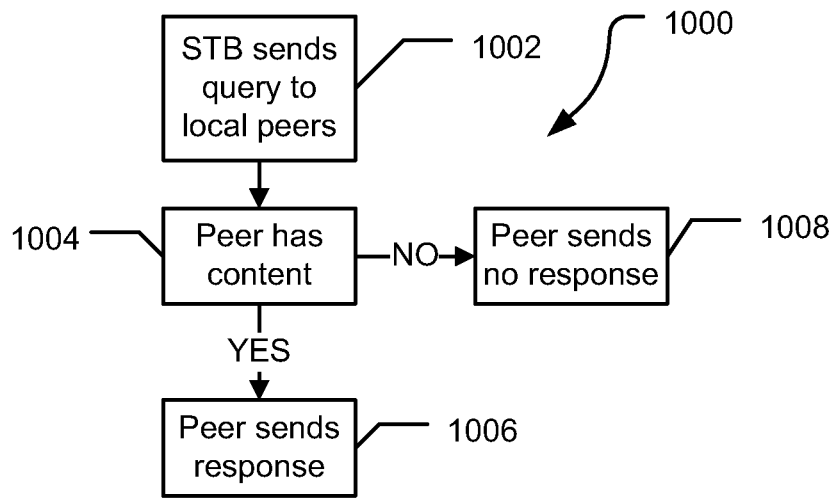

FIG. 10 shows a flow diagram of another exemplary method for identifying sources for VOD content, generally designated 1000. As illustrate at 1002, an STB sends a query for a chunk to local peers. The query may be broadcast to all peers within a local group, such as connected to the same SAI, or SAIs within the same CO. The peer can determine if the peer is storing the chunk, such as by comparing the GUID from the query to an index of stored chunks, as illustrated at 1004. When the peer finds the chunk is available, at 1006, the peer can send a response to the STB indicating the chunk is available from the peer. When the STB receives a response from a peer, the STB may request the chunk from a peer with available bandwidth. Alternatively, at 1008, when the peer does not find the chunk available, the peer sends no response to the STB. If the STB receives no responses from the peers, the STB may request the chunk from the VOD server.

Figure 11:
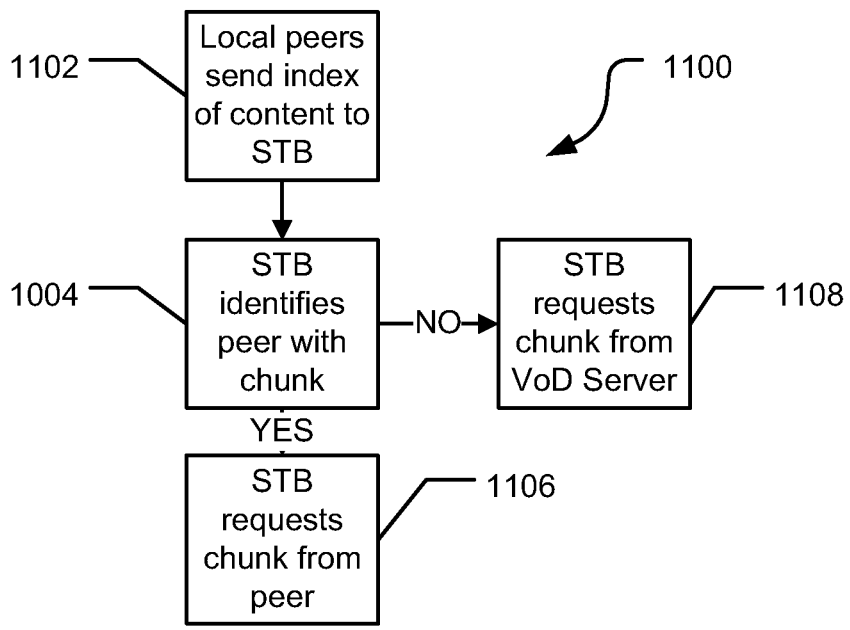

FIG. 11 shows a flow diagram of a further exemplary method for identifying sources for VOD content, generally designated 1100. At 1102, local peers send an index of content to an STB. For example, local peers may periodically broadcast an update containing the GUIDs of stored chunks. Alternatively, local peers may broadcast the GUID of a chunk that is received or deleted. The STB may combine the indexes from multiple local peers to form a local view. The local view can identify which peers have a GUID. When a chunk is needed, the STB can search the local view for a peer having the chunk, as illustrated at 1104. When the STB identifies a peer with the chunk, at 1106, the STB may request the chunk from the peer. In an exemplary embodiment, when the STB identifies multiple peers having the chunk, the STB may request the chunk from the peer with the most available bandwidth. Alternatively, at 1108, when the STB does not identify a peer with the chunk, the STB may request the chunk from the VOD server.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:

receiving, by a system comprising a processor, multiple requests for a portion of content, wherein the requests include deadlines indicating when the portion of the content is required for playback, wherein the requests originate from a first plurality of set-top boxes, and wherein the requests include two or more required bit-rates for the first plurality of set-top boxes;

for the first plurality of set-top boxes, joining, by the system, the first plurality of set-top boxes to a first prescheduled multicast session and to a second prescheduled multicast session, wherein the first prescheduled multicast session provides the portion of the content requested in conformance with an earliest one of the deadlines, and wherein the second prescheduled multicast session provides a remainder of the content;

providing, by the system, the portion of the content requested through the first prescheduled multicast session to the first plurality of set-top boxes, wherein the portion of the content requested is provided according to the required bit-rates;

providing, by the system, the remaining portion of the content from the second prescheduled multicast session to the first plurality of set-top boxes simultaneously while the portion of the content requested is provided from the first prescheduled multicast session, wherein the first plurality of set-top boxes cache the remaining portion of the content, and wherein the first plurality of set-top boxes leave the first prescheduled multicast session when the first prescheduled multicast session reaches a start of the cached remaining portion of the content;

receiving, by the system, from a second plurality of set-top boxes first globally unique identifiers of chunks of content stored by the second plurality of set-top boxes, wherein each chunk has a presentation duration of less than 30 seconds;

receiving, by the system, from a third plurality of set-top boxes second globally unique identifiers of chunks of content deleted by the third plurality of set-top boxes;

tracking, by the system, chunks of content according to a collection of globally unique identifiers comprising the first globally unique identifiers and the second globally unique identifiers received from the second plurality of set-top boxes and the third plurality of set-top boxes;

receiving, by the system, from a requesting set-top box a request for a first chunk of content with a first delivery deadline, and a second chunk of content with a second delivery deadline, wherein the first delivery deadline precedes in time the second delivery deadline;

searching, by the system, the collection of globally unique identifiers for set-top boxes having the first and second chunks;

identifying, by the system, from the search a peer set-top box having the first chunk and the second chunk and connected to a same service area interface as the requesting set-top box;

determining, by the system, from the search that no other set-top boxes have the first chunk;

detecting, by the system, that the peer set-top box can provide the second chunk by the second delivery deadline but is unable to provide the first chunk by the first delivery deadline;

determining, by the system, that the first chunk can be delivered from a video on demand server by the first delivery deadline;

providing, by the system, a list of sources of the first and second chunks to the requesting set-top box;

prioritizing, by the system, delivery of the first chunk from the video on demand server, and delivery of the second chunk from the second set-top box;

initiating, by the system, delivery to the requesting set-top box of the first chunk from the video on demand server according to the first delivery deadline; and initiating, by the system, delivery to the requesting set-top box of the second chunk from the peer set-top box according to the second delivery deadline.

2. A method, comprising:

receiving, by a system comprising a processor, multiple requests for portions of content, wherein the requests include deadlines indicating when the portions of the content are required for playback, wherein the multiple requests originate from a first plurality of set-top boxes, and wherein the multiple requests include two or more required bit rates for the first plurality of set-top boxes;

for the first plurality of set-top boxes,
  grouping, by the system, the requests based on the portions of the content requested;
  identifying, by the system, a plurality of prescheduled multicast streams, each prescheduled multicast stream including a subset of the content;
  prioritizing, by the system, the plurality of prescheduled multicast streams based on a number of multiple requests;
  joining, by the system, the first plurality of set-top boxes to the plurality of prescheduled multicast streams;
  providing, by the system, the first plurality of set-top boxes with the requested portions of the content from a first portion of the plurality of prescheduled multicast streams according to the required bit rates;
  providing, by the system, the first plurality of set-top boxes with a remaining portion of the content from a second portion of the plurality of prescheduled multicast streams, wherein the first plurality of set-top boxes receive the requested portions and the remaining portion of the content simultaneously, wherein the first plurality of set-top boxes cache the remaining portion of the content, and wherein the first plurality of set-top boxes leave the first portion of the plurality of prescheduled multicast streams providing the requested portions when the first portion of the plurality of prescheduled multicast streams reaches a start of the cached remaining portion of the content;

receiving, by the system, from a second plurality of set-top boxes first globally unique identifiers of chunks of content stored by the second plurality of set-top boxes, wherein each chunk has a presentation duration of less than 30 seconds;

receiving, by the system, from a third plurality of set-top boxes second globally unique identifiers of chunks of content deleted by the third plurality of set-top boxes;

tracking, by the system, chunks of content according to a collection of globally unique identifiers comprising the first globally unique identifiers and the second globally unique identifiers received from the second plurality of set-top boxes and the third plurality of set-top boxes;

receiving, by the system, from a requesting set-top box a request for a first chunk of content with a first delivery deadline, and a second chunk of content with a second delivery deadline, wherein the first delivery deadline precedes in time the second delivery deadline;

searching, by the system, the collection of globally unique identifiers for set-top boxes having the first and second chunks;

identifying, by the system, from the search a peer set-top box having the first chunk and the second chunk and connected to a same service area interface as the first set-top box;

determining, by the system, from the search that no other set-top boxes have the first chunk;

detecting, by the system, that the peer set-top box can provide the second chunk by the second delivery deadline but is unable to provide the first chunk by the first delivery deadline;

determining, by the system, that the first chunk can be delivered from a video on demand server by the first delivery deadline;

providing, by the system, a list of sources of the first and second chunks to the requesting set-top box;

prioritizing, by the system, deliver of the first chunk from the video on demand server, and delivery of the second chunk from the peer set-top box;

initiating, by the system, delivery to the requesting set-top box of the first chunk from the video on demand server according to the first delivery deadline; and initiating, by the system, delivery to the requesting set-top box of the second chunk from the peer set-top box according to the second delivery deadline.

3. The method of claim 2 wherein the plurality of prescheduled multicast streams are prioritized based on an earliest deadline of the deadlines received from the plurality of set-top boxes.

4. The method of claim 2 wherein the identifying of the plurality of prescheduled multicast streams comprises providing, by the system, the content to a random set of non-requesting client devices by way of the plurality of prescheduled multicast streams.

5. A method, comprising:

receiving, by a system comprising processor, from a first set-top box a first message identifying a first requested portion of content, wherein the first message includes a first deadline indicating when the first requested portion of the content is required for playback at the first set-top box and wherein the first message includes a first required bit-rate for the first set-top box;

receiving, by the system, from a second set-top box a second message identifying a second requested portion of the content, wherein the second message includes a second deadline indicating when the second requested portion of the content is required for playback at the second set-top box, wherein the second message includes a second required bit-rate for the second set-top box, and wherein the first and second required bit-rates are different;

identifying, by the system, a first prescheduled multicast session to provide the first requested portion and the second requested portion of the content prior to an earlier of the first and second deadlines;

identifying, by the system, a second prescheduled multicast session to provide remaining portions of the content, wherein the first set-top box and the second set-top box receive the first and second requested portions while simultaneously receiving the remaining portions of the content, wherein the first set top box and the second set-top box cache the remaining portions of the content, and wherein the first set-top box and the second set-top box leave the first prescheduled multicast session when the first prescheduled multicast session reaches a respective start of the cached remaining portions of the content;

receiving, by the system, from a first plurality of set-top boxes first globally unique identifiers of chunks of content stored by the first plurality of set-top boxes, wherein each chunk has a presentation duration of less than 30 seconds;

receiving, by the system, from a second plurality of set-top boxes second globally unique identifiers of chunks of content deleted by the second plurality of set-top boxes;

tracking, by the system, chunks of content according to a collection of globally unique identifiers comprising the first globally unique identifiers and the second globally unique identifiers received from the first plurality of set-top boxes and the second plurality of set-top boxes;

receiving, by the system, from a requesting set-top box a request for a first chunk of content with a first delivery deadline, and a second chunk of content with a second delivery deadline, wherein the first delivery deadline precedes in time the second delivery deadline;

searching, by the system, the collection of globally unique identifiers for set-top boxes having the first and second chunks;

identifying, by the system, from the search a peer set-top box having the first chunk and the second chunk and connected to a same service area interface as the requesting set-top box;

determining, by the system, from the search that no other set-top boxes have the first chunk;

detecting, by the system, that the peer set-top box can provide the second chunk by the second delivery deadline but is unable to provide the first chunk by the first delivery deadline;

determining, by the system, that the first chunk can be delivered from a video on demand server by the first delivery deadline;

providing, by the system, a list of sources of the first and second chunks to the requesting set-top box;

prioritizing, by the system, delivery of the first chunk from the video on demand server and delivery of the second chunk from the peer set-top box;

initiating, by the system, delivery to the requesting set-top box of the first chunk from the video on demand server according to the first delivery deadline; and initiating, by the system, delivery to the requesting set-top box of the second chunk from the peer set-top box according to the second delivery deadline.

6. The method of claim 5 wherein the first prescheduled multicast session is delayed to aggregate additional requests for the content.

7. A server device, comprising:
a memory storing computer instructions; and
a processor couple to the memory, wherein the processor, responsive to executing the computer instructions, performs operations comprising:

receiving from a set-top box a message identifying a requested portion of content, wherein the request includes a first deadline indicating when the requested portion of the content is required for playback at the set-top box;

identifying a first prescheduled multicast session to provide the requested portion of the content;

scheduling a second prescheduled multicast session to provide a remaining portion of the content while the first prescheduled multicast session simultaneously provides the requested portion of the content, wherein the set-top box receives the requested portion while simultaneously receiving the remaining portion of the content, wherein the set top box caches the remaining portion of the content, and wherein the set-top box leaves the first prescheduled multicast session providing the requested portion when the first prescheduled multicast session reaches a start of the cached remaining portion of the content;

receiving from a first plurality of set-top boxes first globally unique identifiers of chunks of content stored by the first plurality of set-top boxes, wherein each chunk has a presentation duration of less than 30 seconds;

receiving from a second plurality of set-top boxes second globally unique identifiers of chunks of content deleted by the second plurality of set-top boxes;

tracking chunks of content according to a collection of globally unique identifiers comprising the first globally unique identifiers and the second globally unique identifiers received from the first plurality of set-top boxes and the second plurality of set-top boxes;

receiving from a requesting set-top box a request for a first chunk of content with a first delivery deadline, and a second chunk of content with a second delivery deadline, wherein the first delivery deadline precedes in time the second delivery deadline;

searching the collection of globally unique identifiers for set-top boxes having the first and second chunks;

identifying from the search a peer set-top box having the first chunk and the second chunk and connected to a same service area interface as the requesting set-top box;

determining from the search that no other set-top boxes have the first chunk;

detecting that the peer set-top box can provide the second chunk by the second delivery deadline but is unable to provide the first chunk by the first delivery deadline;

determining that the first chunk can be delivered from a video on demand server by the first delivery deadline;

providing a list of sources of the first and second chunks to the requesting set-top box;

prioritizing delivery of the first chunk from the video on demand server, and delivery of the second chunk from the peer set-top box;

initiating delivery to the requesting set-top box of the first chunk from the video on demand server according to the first delivery deadline; and initiating delivery to the requesting set-top box of the second chunk from the peer set-top box according to the second delivery deadline.

\* \* \* \* \*